United States Patent
Seo et al.

(10) Patent No.: US 8,995,297 B2
(45) Date of Patent: Mar. 31, 2015

(54) METHOD FOR CONTROLLING DOWNLINK TRANSMISSION POWER AND APPARATUS FOR SAME

(75) Inventors: Hanbyul Seo, Anyang-si (KR); Youngseob Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 252 days.

(21) Appl. No.: 13/638,553

(22) PCT Filed: Oct. 10, 2011

(86) PCT No.: PCT/KR2011/007475
§ 371 (c)(1),
(2), (4) Date: Sep. 28, 2012

(87) PCT Pub. No.: WO2012/050328
PCT Pub. Date: Apr. 19, 2012

(65) Prior Publication Data
US 2013/0010635 A1 Jan. 10, 2013

Related U.S. Application Data

(60) Provisional application No. 61/391,674, filed on Oct. 10, 2010.

(51) Int. Cl.
*G08C 17/00* (2006.01)
*H04L 1/00* (2006.01)
*H04L 12/26* (2006.01)
*H04W 52/24* (2009.01)
(Continued)

(52) U.S. Cl.
CPC .......... *H04W 52/367* (2013.01); *H04W 52/143* (2013.01); *H04W 52/244* (2013.01); *H04W 52/245* (2013.01); *H04W 84/045* (2013.01)
USPC .......................................... 370/252; 370/311

(58) Field of Classification Search
CPC ....... H04L 47/10; H04L 43/50; H04W 52/02; H04W 52/0216
USPC .................................................. 370/252, 311
See application file for complete search history.

(56) References Cited

U.S. PATENT DOCUMENTS

2006/0009210 A1 * 1/2006 Rinne et al. ................... 455/423
2006/0165032 A1   7/2006 Hamalainen et al.
(Continued)

FOREIGN PATENT DOCUMENTS

KR  10-2007-0094035 A   9/2007
KR  10-2009-0006200 A   1/2009
(Continued)

*Primary Examiner* — Ronald Abelson
(74) *Attorney, Agent, or Firm* — Birch, Stewart, Kolasch & Birch, LLP

(57) ABSTRACT

The present invention relates to a wireless communication system. Particularly, the present invention relates to a method in which a home base station performs power control and an apparatus for the same, the method comprising the steps of: acquiring information on downlink signal strength of a macrocell; and determining an upper limit of downlink transmission power of the home base station by taking into consideration of the downlink signal strength of the macrocell, wherein: when a predetermined condition is satisfied, the upper limit of the downlink transmission power of the home base station is determined to be an intermediate value among a minimum transmission power value, a maximum transmission power value, and a power control value proportional to the downlink signal strength of the macrocell; and when the predetermined condition is not satisfied, the upper limit of the downlink transmission power of the home base station is determined to be a predetermined fixed value, the predetermined condition being a value indicating the downlink signal strength of the macrocell is equal to or greater than a first threshold value.

12 Claims, 8 Drawing Sheets

(51) Int. Cl.
*H04W 52/36* (2009.01)
*H04W 52/14* (2009.01)
*H04W 84/04* (2009.01)

(56) References Cited

U.S. PATENT DOCUMENTS

2007/0270151 A1 11/2007 Claussen et al.

2011/0116476 A1 5/2011 Lee et al.

FOREIGN PATENT DOCUMENTS

| KR | 10-2010-0005374 A | 1/2010 |
| WO | WO 2010/034358 A1 | 4/2010 |
| WO | WO 2010/036180 A1 | 4/2010 |

* cited by examiner (a)

(b)

(a)

(b)

METHOD FOR CONTROLLING DOWNLINK TRANSMISSION POWER AND APPARATUS FOR SAME

CROSS REFERENCE TO RELATED APPLICATIONS

This application is the National Phase of PCT/KR2011/007475 filed on Oct. 10, 2011, which claims priority under 35 U.S.C. 119(e) to U.S. Provisional Application No. 61/391,674 filed on Oct. 10, 2010, all of which are hereby expressly incorporated by reference into the present application.

TECHNICAL FIELD

The present invention relates to a wireless communication system, and more particularly, to an apparatus for controlling a downlink transmission power and method thereof.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For examples of the multiple access system, there are CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Task

Accordingly, the present invention is directed to an apparatus for controlling a downlink transmission power in a wireless communication system and method thereof that substantially obviate one or more problems due to limitations and disadvantages of the related art.

One object of the present invention is to provide an apparatus for controlling a downlink transmission power of a home base station in a heterogeneous network.

Technical tasks obtainable from the present invention are non-limited the above-mentioned technical task. And, other unmentioned technical tasks can be clearly understood from the following description by those having ordinary skill in the technical field to which the present invention pertains.

Technical Solution

According to an aspect of the present invention, A method for performing power control by a home base station in a wireless communication system, the method comprising: acquiring information on downlink signal strength of a macro cell; and determining an upper limit of downlink transmission power of the home base station in consideration of the downlink signal strength of the macro cell, wherein if a certain condition is satisfied, the upper limit of downlink transmission power of the home base station is given as an intermediate value among a minimum transmission power value, a maximum transmission power value, and a power control value proportional to the downlink signal strength of the macro cell, wherein if the certain condition is not satisfied, the upper limit of downlink transmission power of the home base station is given as a certain fixed value, and wherein the certain condition includes that a value indicating the downlink signal strength of the macro cell is equal to or more than a first threshold value.

According to other aspect of the present invention, A home base station configured to perform power control in a wireless communication system, the home base station comprising: a radio frequency (RF) unit; and a processor, wherein the processor is configured to acquire information on downlink signal strength of a macro cell, and to determine an upper limit of the downlink transmission power of the home base station in consideration of the downlink signal strength of the macro cell, wherein if a certain condition is satisfied, the upper limit of downlink transmission power of the home base station is given as an intermediate value among a minimum transmission power value, a maximum transmission power value, and a power control value proportional to the downlink signal strength of the macro cell, wherein if the certain condition is not satisfied, the upper limit of downlink transmission power of the home base station is given as a certain fixed value, and wherein the certain condition includes that a value indicating the downlink signal strength of the macro cell is equal to or more than a first threshold value.

Preferably, the acquiring the information includes receiving a measurement report on the downlink signal of the macro cell from a user equipment.

Preferably, the acquiring the information includes measuring the downlink signal of the macro cell at the home base station.

Preferably, the power control value (P') is given by following Equation:

$$P' = \alpha \times P\_M + \beta$$

where, P_M represents a parameter related to the downlink signal strength of the macro cell, α represents a positive value, and β represents a correction value for power control.

Preferably, the processor is further configured to further to perform downlink transmission, and wherein the transmission power of the downlink transmission is equal or less than the upper limit of downlink transmission power of the home base station.

Preferably, if a value indicating uplink signal strength of a macro user equipment is equal to or more than a second threshold value, the power control value is decreased in consideration the uplink signal strength, and if the value indicating the uplink signal strength of the macro user equipment is less than the second threshold value, the power control value is maintained as it is.

Preferably, if a value indicating uplink signal strength of a macro user equipment is equal to or more than a second threshold value, the maximum transmission power value is decreased in consideration of the uplink signal strength, and if the value indicating the uplink signal strength of the macro user equipment is less than the second threshold value, the maximum transmission power value is maintained as it is.

Advantageous Effects

Accordingly, the present invention may be able to control a downlink transmission power in a wireless communication system. In particular, the present invention may be able to efficiently control a downlink transmission power of a home base station in a heterogeneous network.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings.

BEST MODE FOR INVENTION

Mode for Invention

Reference will now be made in detail to the preferred embodiments of the present invention, examples of which are illustrated in the accompanying drawings. Wherever possible, the same reference numbers will be used throughout the drawings to refer to the same or like parts.

First of all, embodiments of the present invention are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a wireless technology as UTRA (universal terrestrial radio access), CDMA 2000 and the like. TDMA can be implemented with such a wireless technology as GSM/GPRS/EDGE (Global System for Mobile communications)/General Packet Radio Service/Enhanced Data Rates for GSM Evolution). OFDMA can be implemented with such a wireless technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in DL and SC-FDMA in UL. And, LTE-A (LTE-Advanced) is an evolved version of 3GPP LTE.

For clarity, the following description mainly concerns 3GPP LTE/LTE-A, by which the present invention is non-limited. Specific terminologies used in the following description are provided to help an understanding of the present invention. And, a usage of the specific terminology can be modified into other forms that come within the scope of the appended claims and their equivalents.

Figure 1:
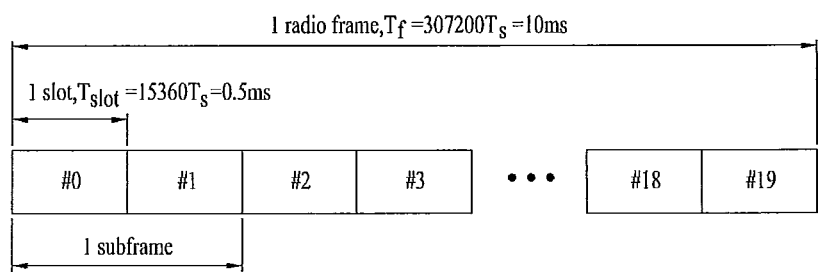
FIG. 1 is a diagram for one example of a structure of a radio frame.

FIG. 1 is a diagram for one example of a structure of a radio frame.

Referring to FIG. 1, a radio frame includes 10 subframes. Each of the subframes includes 2 slots in time domain. And, a time taken to transmit a subframe is defined as a transmission time interval (hereinafter abbreviated TTI). For instance, one subframe can have a length of 1 ms and one slot can have a length of 0.5 ms. One slot has a plurality of OFDM (orthogonal frequency division multiplexing) or SC-FDMA (single carrier frequency division multiple access) symbols in time domain. LTE uses OFDMA in DL and also uses SC-FDMA in UL. Hence, OFDM or SC-FDMA symbol indicates one symbol duration. A resource block (hereinafter abbreviated RB) is a resource allocation unit and includes a plurality of contiguous subcarriers in one slot. The structure of the radio frame shown in the drawing is exemplary. Optionally, the number of subframes included in a radio frame, the number of slots included in the subframe, and the number of symbols included in the slot can be modified by various schemes.

Figure 2:
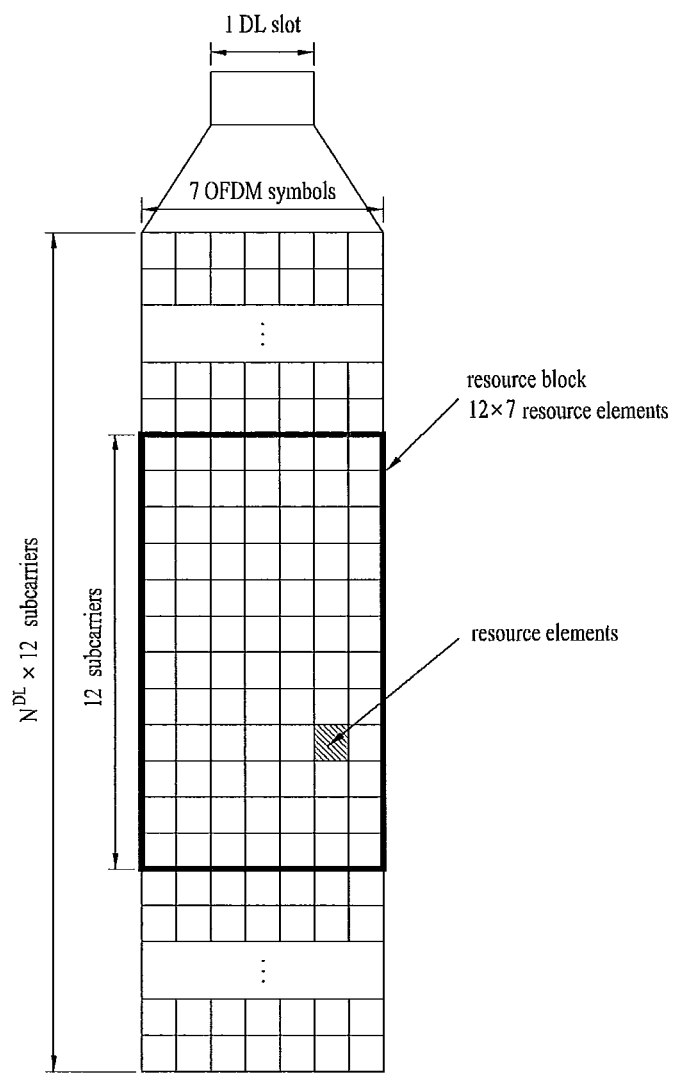
FIG. 2 is a diagram for one example of a resource grid of a downlink (hereinafter abbreviated DL) slot.

FIG. 2 is a diagram for one example of a resource grid of a DL slot.

Referring to FIG. 2, a DL slot includes a plurality of OFDM symbols in time domain. One DL slot includes 7 or 6 OFDM symbols and a resource block is able to include 12 subcarriers in frequency domain. Each element on a resource grid is named a resource element (hereinafter abbreviated RE). One RG includes 12×6 or 12×7 REs. The number $N_{RB}$ of RBs included in a DL slot depends on a DL transmission bandwidth. A structure of a UL slot is similar to that of the DL slot, in which OFDM symbol is substituted with SC-FDMA symbol.

Figure 3:
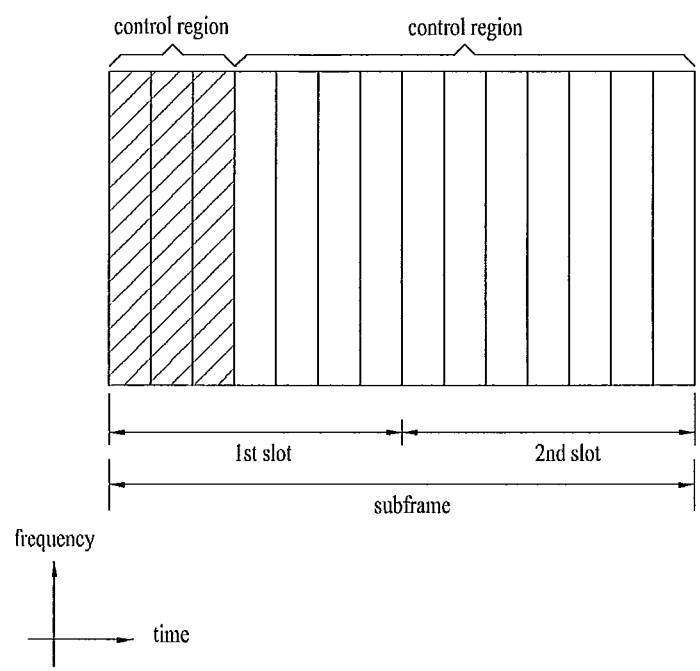
FIG. 3 is a diagram for a structure of a DL frame.

FIG. 3 is a diagram for a structure of a DL frame.

Referring to FIG. 3, maximum 3 or 4 OFDM symbols situated in a head part of a first slot of a subframe corresponds to a control region to which a control channel is allocated. The rest of the OFDM symbols correspond to a data region to which PDSCH (physical downlink shared channel) is allocated. Examples of a DL control channel used by LTE include PCFICH (Physical Control Format Indicator Channel), PDCCH (Physical Downlink Control Channel), PHICH (Physical hybrid ARQ indicator Channel) and the like. The PCFICH is transmitted in a first OFDM symbol of a subframe and carries an information on the number of OFDM symbols used for a transmission of a control channel within the subframe. The PHICH carries HARQ ACK/NACK (Hybrid Automatic Repeat request acknowledgment/negative-acknowledgment) signal in response to a UL transmission.

The control information transmitted on PDCCH is named a downlink control information (DCI). The DCI includes a resource allocation information for a user equipment or a user equipment group and other control informations. For instance, the DCI includes UL/DL scheduling information, UL transmission (Tx) power control command and the like.

The PDCCH carries transmission format and resource allocation information of DL-SCH (downlink shared channel), transmission format and resource allocation information of UL-SCH (uplink shared channel), paging information on PCH (paging channel), system information on DL-SCH, resource allocation information of such a higher layer control message as a random access response transmitted on PDSCH, Tx power control command set for individual UEs within a UE group, Tx power control command, activation indication information of VoIP (voice over IP) and the like. A plurality of PDCCHs can be carried on the control region. A user equipment is able to monitor a plurality of the PDCCHs. The PDCCH is carried on an aggregation of at least one or more contiguous CCEs (control channel elements). The CCE is a logical allocation unit used in providing the PDCCH with a coding rate based on a radio channel status. The CCE corresponds to a plurality of REGs (resource element groups). A format of the PDCCH and the number of PDCCH bits are determined in accordance with the number of CCEs. A base station determines a PDCCH format in accordance with a DCI which is to be transmitted to a user equipment and attaches a CRC (cyclic redundancy check) to a control information. The CRC is masked with an identifier (e.g., RNTI (radio network temporary identifier) in accordance with an owner of the PDCCH or a purpose of using the PDCCH. For instance, if the PDCCH is provided for a specific user equipment, an identifier (e.g., cell-RNTI (C-RNTI) of the corresponding user equipment can be masked on the CRC. In case that the PDCCH is provided for a paging message, a paging identifier (e.g., paging-RNTI (P-RNTI)) can be masked on the CRC. If the PDCCH is provided for system information (particularly, a system information block (SIC)), the CRC may be masked with SI-RNTI (system information RNTI). If the PDCCH is provided for a random access response, the CRC may be masked with RA-RNTI (random access-RNTI).

Figure 4:
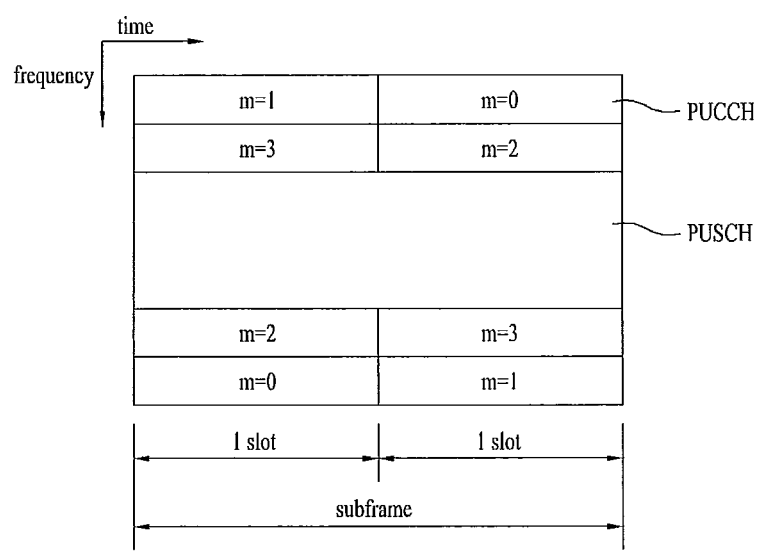
FIG. 4 is a diagram for one example of a structure of an uplink (hereinafter abbreviated UL) subframe.

FIG. 4 is a diagram for one example of a structure of a UL subframe.

Referring to FIG. 4, a UL frame includes a plurality of slots (e.g., 2 slots). Each of the slots is able to include a different number of SC-FDMA symbols in accordance with a CP length. The UL subframe can be divided into a data region and a control region in frequency domain. The data region includes PUSCH and is used to transmit such a data signal as an audio and the like. The control region includes PUCCH and is used to transmit UL control information (UCI). The PUCCH includes an RB pair situated at both ends of the data region and performs hopping on the boundary of a slot.

The PUCCH may be used to transmit the following control informations.
  SR (scheduling request): This information is used to request an uplink UL-SCH resource and is transmitted by OOK (on-off keying) scheme.
  HARQ ACK/NACK: This is a response signal to a DL data packet on PDSCH. This signal indicates whether the DL data packet is successfully received. 1-bit ACK/NACK is transmitted in response to a single DL codeword. 2-bit ACK/NACK is transmitted in response to two DL codewords.
  CQI (channel quality indicator): This is feedback information on a DL channel. MIMO-related (multiple input multiple output related) feedback information includes RI (rank indicator), PMI (precoding matrix indicator), PTI (precoding type indicator) and the like. And, 20 bits per subframe are used.

A size or quantity of control information (UCI), which can be transmitted in a subframe by a user equipment, may depend on the number of SC-FDMAs available for control information transmission. The SC-FDMA available for the control information transmission means SC-FDMA symbol left after excluding SC-FDMA symbols for reference signal transmission in subframe. In case of SRS (sounding reference signal) set subframe, a last SC-FDMA symbol of the subframe is excluded as well. A reference signal is used for coherent detection of PUCCH. And, PUCCH supports 7 formats according to transmitted information.

Table 1 shows mapping relation between PUCCH format and UCI in LTE.

TABLE 1

| PUCCH Format | Uplink Control Information (UCI) |
|---|---|
| Format 1 | SR (scheduling request) (non-modulated waveform) |
| Format 1a | 1-bit HARQ ACK/NACK (SR present/absent) |
| Format 1b | 2-bit HARQ ACK/NACK (SR present/absent) |
| Format 2 | CQI (20 coded bits) |
| Format 2 | CQI and 1- or 2-bit HARQ ACK/NACK (20 bits) (extended CP corresponds only) |
| Format 2a | CQI and 1-bit HARQ ACK/NACK ((20 + 1) coded bits) |
| Format 2b | CQI and 2-bit HARQ ACK/NACK ((20 + 2) coded bits) |

Figure 5:
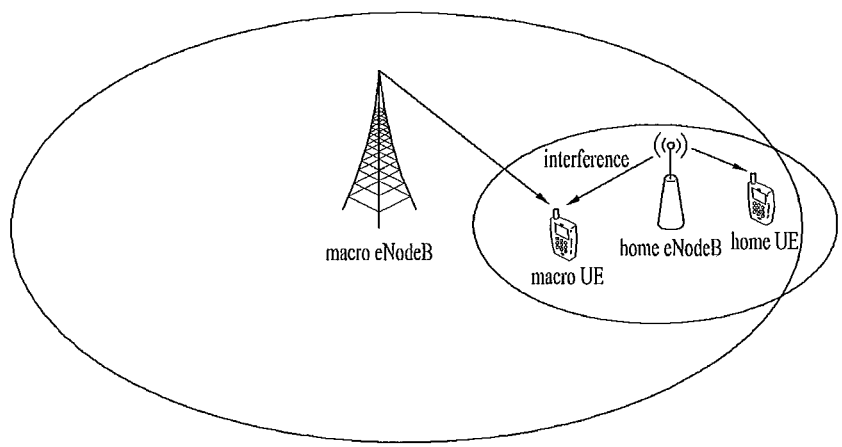
FIG. 5 is a diagram for one example of mapping PUCCH format to PUCCH region physically.

FIG. 5 shows one example of a heterogeneous network including a macro cell and a micro cell. In the next generation communication standards including 3GPP LTE-A and the like, there are ongoing discussions on a heterogeneous network in which a micro cell having a low transmission power exists by overlapping within a conventional macro cell coverage.

Referring to FIG. 5, a macro cell may be able to overlap with at least one micro cells. A service of the macro cell may be provided by a macro base station (macro eNodeB: MeNB). In this specification, a macro cell and a macro eNodeB may be usable interchangeably. A user equipment connected to the macro cell may be called a macro user equipment (macro UE). The macro UE may receive a DL signal from the macro eNodeB and transmit a UL signal to the macro eNodeB.

The micro cell may be called a femto cell or a pico cell. The service of the micro cell may be provided by one of a pico eNodeB, a home eNodeB (HeNB), a relay node (RN) and the like. For clarity and convenience of the following description, a pico eNodeB, a home eNodeB (HeNB), a relay node (RN) or the like may be commonly called a home eNodeB (HeNB). In the present specification, the micro cell and the home eNodeB may be interchangeably usable. A user equipment connected to a micro cell may be called a micro user equipment or a home user equipment (home-UE). The home user equipment receives a downlink signal from the home eNodeB and also transmits an uplink signal to the home eNodeB.

Micro cells may be classified into an OA (open access) cell and a CSG (closed subscriber group) cell in accordance with accessibility. In particular, the OA cell may mean the micro cell that enables a user equipment to receive a service at any time without separate access restriction if necessary. On the other hand, the CSG cell may mean the micro cell that enables a granted specific user equipment to receive a service only.

Since a macro cell and a micro cell are configured to overlap with each other in a heterogeneous network, inter-cell interference may cause a serious problem. In case that a macro user equipment is located on the boundary between a macro cell and micro cell, as shown in FIG. 5, a downlink signal of a home eNodeB may work as interference on the macro user equipment. Similarly, a downlink signal of a macro base station may work as interference on a home user equipment in a micro cell. Moreover, an uplink signal of a macro user equipment may work as interference on a home eNodeB. Similarly, an uplink signal of a home user equipment may work as interference on a macro eNodeB.

Hence, in case that a heterogeneous network is configured, a related art home eNodeB controls it DL power by utilizing a DL signal strength of a macro eNodeB in order to secure performance of a neighbor macro user equipment and to maintain its coverage. In this case, the DL signal strength of the macro eNodeB may be directly measured via a DL receiver of the home eNodeB. Alternatively, the DL signal strength of the macro eNodeB may be inferred from a measurement report made by a user equipment, and preferably, by a home user equipment.

Formula 1 shows one example of a DL power control method of a home eNodeB according to a related art. In the following formula, each parameter may be given per DL physical channel. For instance, the DL physical channel may include one of PCFICH (Physical Control Format Indicator Channel), PHICH (Physical hybrid ARQ indicator Channel), PDCCH (Physical Downlink Control Channel), PDSCH (Physical Downlink Shared Channel) and the like.

$$P\_tx = \text{MEDIAN}(\alpha \times P\_M + \beta, P\_max, P\_min)[dBm] \quad \text{[Formula 1]}$$

In Formula 1, P_tx indicates a DL transmission power of a home eNodeB or an upper limit of the DL transmission power. Hence, a real DL transmission power of the home eNodeB may have a value equal to or smaller than P_tx.

The P_max indicates a maximum transmission power of the home eNodeB. P_min indicates a minimum transmission power of the home eNodeB. And, each of the P_max and the P_min may be given in accordance with a physical performance of an RF (radio frequency) module or may be arbitrarily set by a network.

The P_M indicates a strength/power of a DL signal of a macro eNodeB or a value associated with the strength or power. For instance, the P_M may indicates SNR (signal to noise ratio), SINR (signal to interference and noise ratio), CIR (carrier to interference ratio), CINR (carrier to interference and noise ratio), RSRP (reference signal received power), RSRQ (reference signal received quality) or a value associated thereof. The P_M may be obtained by measuring a reference signal of the macro eNodeB. And, the P_M may be measured or defined by a resource element unit.

The α is a constant or a parameter (combination) for a power control. And, the β is a constant or a parameter (combination) for a power control.

The MEDIAN (A, B, C) may indicate a median value of A, B and C. The MEDIAN (A, B, C) may be represented as an equivalent formula. For instance, MEDIAN (A, B, C)=MAX (A, MIN (B, C))=MIN (A, MAX (B, C)). In this case, MAX (A, B) indicates either A or B, which is greater than the other. MIN (A, B) indicates either A or B, which is smaller than the other.

Figure 6:
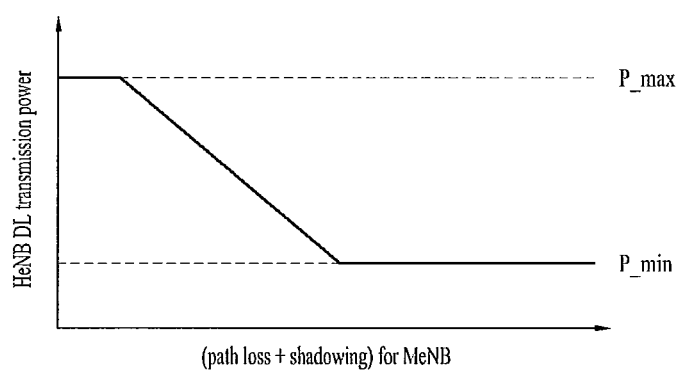
FIG. 6 is a diagram for one example of a power control method in a heterogeneous network according to a related art.

FIG. 6 shows one example of a power control method in accordance with Formula 1. In Formula 1, an upper limit P_tx of a DL transmission power of a home eNodeB is set to be in direct proportion to P_M within a predetermined range. A value of (path loss+shadowing) for a macro eNodeB is related to P_M. If the (path loss+shadowing) value increases, the P_M decreases. If the (path loss+shadowing) value decreases, the P_M increases.

Referring to FIG. 6, as P_M increases, P_tx of a home eNodeB is set high. Hence, in case that the home eNodeB is located adjacent to a macro eNodeB, it may be able to protect a coverage of the home eNodeB from strong interference of the macro eNodeB. On the contrary, as P_M decreases, P_tx of a home eNodeB is set low. Hence, in case that the home eNodeB is located remote from a macro eNodeB, it may be able to secure performance of a macro user equipment affected by strong interference from the home eNodeB.

Yet, according to properties of a home eNodeB generally installed at an indoor place, it may be highly probable that a DL signal of a macro eNodeB, which is measured in the vicinity of the home eNodeB, becomes considerably weak by passing through a wall of the corresponding building. Hence, P_M obtained by the home eNodeB may become very small. In doing so, if the method according to Formula 1 applies, despite that a real DL signal strength of the macro eNodeB is high, a DL transmission power of the home eNodeB may be limited by a minimum transmission power P_min. In this case, DL performance of the home eNodeB may be deteriorated. Meanwhile, a distance between a macro eNodeB and a home eNodeB may be set enough to avoid interference in-between. According to the method of Formula 1, despite the low probability of inter-cell interference, as P_M is small, a DL transmission power of the home eNodeB may be limited by a minimum transmission power P_min. Hence, DL performance of the home eNodeB may be deteriorated.

In order to solve the above-described problems, the present invention proposes a method of efficiently performing a DL power control (or power setting) of a home eNodeB in order to minimize inter-cell interference in a heterogeneous network.

A DL power control of a home eNodeB according to the present invention assumes that heterogeneous eNodeBs (i.e., channels of the heterogeneous eNodeBs) coexist. Therefore, the DL power control of the home eNodeB according to the present invention may apply only if channels of the heterogeneous eNodeBs coexist. To this end, the DL power control of the home eNodeB according to this proposal may be limitedly applicable only if a strength/power (P_M) of a DL signal of a heterogeneous eNodeB (e.g., a macro eNodeB) or a value associated with the strength/power has a value equal to or greater than a prescribed threshold at least. In particular, the P_M or the associated value is equal to or greater than the prescribed threshold, as channels of the home eNodeB and the macro eNodeB coexist, the home eNodeB may be able to use the power control method proposed by the present invention. On the contrary, if the P_M or the associated value is smaller than the prescribed threshold, as the channels of the home eNodeB and the macro eNodeB do not coexist (i.e., the home eNodeB is isolated from the macro eNodeB), the home eNodeB need not perform the power control in consideration of the macro eNodeB.

1$^{st}$ Embodiment

According to the present embodiment, if a home eNodeB is installed in an area isolated from a signal of a macro eNodeB, although a DL signal of the macro eNodeB is considerably small, P_tx of the home eNodeB may be set to have a value greater than P_min. Whether the home eNodeB is isolated may be previously set by a network service provider. Moreover, whether the home eNodeB is isolated may be indirectly inferred by measuring a DL signal of the macro eNodeB. For instance, if a prescribed threshold is set for the home eNodeB, the home eNodeB may be ale to determine an isolated situation for a case that P_M, another DL signal measured value or a size of a value associated with the P_M or the DL signal measured value is smaller than the threshold.

The P_M may indicate a DL signal strength of the macro eNodeB or a value associated with the DL signal strength. For instance, the P_M may be able to indicate SNR, SINR, CIR, CINR, RSRP, RSRQ or an associated value thereof. Hence, the P_M may be associated with a size of a path loss and shadowing from the macro eNodeB to the home eNodeB (or a home user equipment). The P_M may be directly measured via a DL receiver of the home eNodeB. Alternatively, the P_M may be inferred from a measurement report made by a user equipment, and preferably, by a home user equipment.

According to the present example, if a size of the P_M becomes smaller than a threshold (e.g., if a size of a path loss and shadowing from the macro eNodeB to the home eNodeB exceeds the threshold), P_tx of the home eNodeB may be set higher than P_min. For instance, if the size of the P_M becomes smaller than the threshold, the home eNodeB may be able to maintain the P_tx as a predetermined value greater than the P_min. For another instance, if the size of the P_M becomes smaller than the threshold, the home eNodeB may be able to adaptively increase the P_tx in consideration of the size of the P_M. According to the present embodiment, the threshold may be set to a fixed value or a value variable in accordance with a peripheral situation. For example, the threshold may be set to a strength of total received DL signals (or powers) or a value associated with the total strength. In this case, a signal (or power) of the home eNodeB may be excluded from the total received DL signals (or powers).

Formulas 2 to 5 may show examples of a power control method according to the present embodiment.

$$P\_tx = \text{MEDIAN}(P', P\_max, P\_min)[\text{dBm}] \quad \text{[Formula 2]}$$

$$P' = \begin{cases} \alpha \times P\_M + \beta & (P\_M \geq \text{Threshold}) \\ \gamma & (P\_M < \text{Threshold}) \end{cases}$$

or $$P\_tx = \begin{cases} \text{MEDIAN}\begin{matrix}(\alpha \times P\_M + \beta, \\ P\_max, P\_min)\end{matrix} & (P\_M \geq \text{Threshold}) \\ \gamma & (P\_M < \text{Threshold}) \end{cases}$$

In Formula 2, P_tx, P_max, P_min, P_M, α, β and MEDIAN (A, B, C) are identical to those defined in Formula 1. And, γ indicates a constant or a parameter (combination) for a power control (γ>P_min).

$$P\_tx = \text{MEDIAN}(P', P\_max, P\_min)[\text{dBm}] \quad \text{[Formula 3]}$$

$$P' = \begin{cases} \alpha \times P\_M + \beta & (P\_M \geq \text{Threshold\_1}) \\ \gamma_1 & (\text{Threshold\_2} \leq P\_M < \text{Threshold\_1}) \\ \gamma_2 & (\text{Threshold\_3} \leq P\_M < \text{Threshold\_2}) \\ \vdots & \\ \gamma_n & (P\_M < \text{Threshold\_n}) \end{cases}$$

or $$P\_tx = \begin{cases} \text{MEDIAN}\begin{matrix}(\alpha \times P\_M + \beta, \\ P\_max, P\_min)\end{matrix} & (P\_M \geq \text{Threshold\_1}) \\ \gamma_1 & (\text{Threshold\_2} \leq P\_M < \text{Threshold\_1}) \\ \gamma_2 & (\text{Threshold\_3} \leq P\_M < \text{Threshold\_2}) \\ \vdots & \\ \gamma_n & (P\_M < \text{Threshold\_n}) \end{cases}$$

In Formula 3, P_tx, P_max, P_min, P_M, α, β and MEDIAN (A, B, C) are identical to those defined in Formula 1. And, $\gamma_1, \gamma_2, \ldots, \gamma_n$ indicate constants or parameters (combinations) for a power control ($P\_min < \gamma_1 < \gamma_2 < \ldots < \gamma_n$).

$$P\_tx = \text{MEDIAN}(P', P\_max, P\_min)[\text{dBm}] \quad \text{[Formula 4]}$$

$$P' = \begin{cases} \alpha \times P\_M + \beta & (P\_M \geq \text{Threshold}) \\ \alpha' \times (A - \kappa \times P\_M) + \beta' & (P\_M < \text{Threshold}) \end{cases}$$

In Formula 4, P_tx, P_max, P_min, P_M, α, β and MEDIAN (A, B, C) are identical to those defined in Formula 1. The α', β' and κ' indicate constants or parameters (or combinations) for a power control, respectively. Moreover, the A indicates a constant or a parameter (combination) for a power control.

$$P\_tx = \text{MEDIAN}(P', P\_max, P\_min)[\text{dBm}] \quad \text{[Formula 5]}$$

$$P' = \begin{cases} \alpha \times P\_M + \beta & (P\_M \geq \text{Threshold}) \\ \alpha' \times \dfrac{1}{P\_M} + \beta' & (P\_M < \text{Threshold}) \end{cases}$$

In Formula 5, P_tx, P_max, P_min, P_M, α, β and MEDIAN (A, B, C) are identical to those defined in Formula 1. The α' and β' indicate constants or parameters (or combinations) for a power control, respectively.

Figure 7:
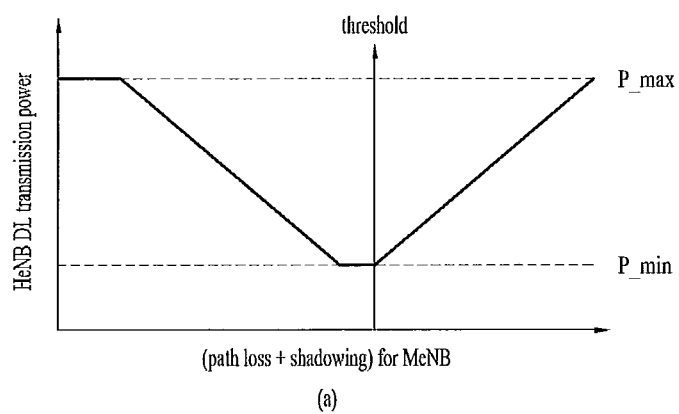
FIG. 7 and FIG. 8 are diagrams for a method of controlling a power according to one embodiment of the present invention.
Figure 7:
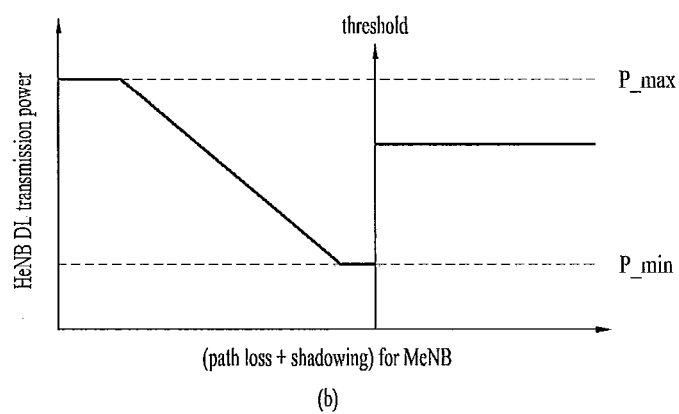

FIG. 7 shows a power control method according to a $1^{st}$ embodiment of the present invention. Referring to FIG. 7(b), if a size of a path loss and shadowing exceeds a threshold, as the size of the path loss and shadowing increases, P_tx of a home eNodeB is maintained at a level higher than P_min. On the contrary, referring to FIG. 7 (a), if a size of a path loss and shadowing exceeds a threshold, as the size of the path loss and shadowing increases, P_tx of a home eNodeB is raised at a predetermined rate. This is exemplary. After the threshold, as the size of the path loss and shadowing increases, P_tx may increase step by step. After the size of the path loss and shadowing has been divided into several intervals, as the size of the path loss and shadowing becomes greater than the threshold, the P_tx may be raised at a rate given to each of the intervals.

$2^{nd}$ Embodiment

A home eNodeB measures UL interference on neighbor macro user equipments via a UL receiver and knows a presence/distance of a macro user equipment located in a neighbor area through a UL interference size. For instance, if a size of the UL interference becomes greater than a predetermined threshold, it may be able to determine that a macro user equipment exists in the vicinity of the home eNodeB. In this case, in order to secure performance of the macro user equipment receiving interference from the home eNodeB, it may be necessary to control a DL power of the home eNodeB.

Therefore, the present example proposes to perform a DL power control of a home eNodeB in consideration of a UL interference size measured by the home eNodeB. In particular, if UL interference exceeds a predetermined threshold, the home eNodeB determines that a macro user equipment exists in a neighbor area and may be then able to set P_tx of the home eNodeB to have a value smaller than P_max. For instance, if the UL interference size exceeds the threshold, the home eNodeB may be able to maintain the P_tx as a predetermined value smaller than the P_max. For another instance, if the UL interference exceeds a predetermined threshold, the home eNodeB may be able to adaptively lower the P_tx in consideration of a size of the UL interference.

The size P_UL of the UL interference may be obtained using various methods known to the public in the corresponding field. For instance, the size P_UL of the UL interference may be obtainable using a strength/power of a UL signal of a macro user equipment or a value associated with the strength/power. In particular, the size P_UL of the UL interference may be obtained from SNR, SINR, CINR, RSRP, RSRQ or an associated value thereof. The P_UL may be obtained by measuring a reference signal of a macro user equipment. The P_UL may be measured/defined by a resource element unit. According to the present embodiment, the threshold may be set to a fixed value or a value variable in accordance with a peripheral situation. For example, the threshold may be set to a strength of total received UL signals (or powers) or a value associated with the total strength. In this case, a signal (or power) of the home eNodeB may be excluded from the total received UL signals (or powers).

Formulas 6 to 9 may show examples of a power control method according to the present embodiment.

$$P\_tx = \text{MEDIAN}(P', P\_max, P\_min)[dBm] \quad \text{[Formula 6]}$$

$$P' = \begin{cases} \alpha \times P\_M + \beta & (P\_UL < \text{Threshold}) \\ \gamma & (P\_UL \geq \text{Threshold}) \end{cases}$$

or $$P' = \begin{cases} \alpha \times P\_M + \beta & (P\_UL < \text{Threshold}) \\ \alpha \times P\_M + \beta - \gamma' & (P\_UL \geq \text{Threshold}) \end{cases}$$

In Formula 6, P_tx, P_max, P_min, P_M, $\alpha$, $\beta$ and MEDIAN (A, B, C) are identical to those defined in Formula 1. P_UL indicates a UL interference size measured from a user equipment (e.g., a macro user equipment) or a value associated with the UL interference size. And, $\gamma$ indicates a constant or a parameter (combination) for a power control ($\gamma$<P_max). Moreover, $\gamma'$ indicates a constant or a parameter (combination) for a power control.

$$P\_tx = \text{MEDIAN}(P', P\_max, P\_min)[dBm] \quad \text{[Formula 7]}$$

$$P' = \begin{cases} \alpha \times P\_M + \beta & (P\_UL < \text{Threshold\_1}) \\ \gamma_1 & (\text{Threshold\_1} \leq P\_UL < \text{Threshold\_2}) \\ \gamma_2 & (\text{Threshold\_2} \leq P\_UL < \text{Threshold\_3}) \\ \vdots \\ \gamma_n & (\text{Threshold\_n} \leq P\_UL < \text{Threshold\_n+1}) \end{cases}$$

or $$P' = \begin{cases} \alpha \times P\_M + \beta, & (P\_UL < \text{Threshold\_1}) \\ \alpha \times P\_M + \beta - \gamma'_1, & (\text{Threshold\_1} \leq P\_UL < \text{Threshold\_2}) \\ \alpha \times P\_M + \beta - \gamma'_2, & (\text{Threshold\_2} \leq P\_UL < \text{Threshold\_3}) \\ \vdots \\ \alpha \times P\_M + \beta - \gamma'_n, & (\text{Threshold\_n} \leq P\_UL < \text{Threshold\_n+1}) \end{cases}$$

In Formula 7, P_tx, P_max, P_min, P_M, $\alpha$, $\beta$ and MEDIAN (A, B, C) are identical to those defined in Formula 1. P_UL indicates a UL interference size measured from a user equipment (e.g., a macro user equipment) or a value associated with the UL interference size. And, $\gamma_1, \gamma_2, \ldots, \gamma_n$ indicate constants or parameters (combinations) for a power control (P_max>$\gamma_1$>$\gamma_2$> ... >$\gamma_n$). Moreover, And, $\gamma'_1, \gamma'_2, \ldots \gamma'_n$ indicate constants or parameters (combinations) for a power control ($\gamma'_1$<$\gamma'_2$ ... $\gamma'_n$).

$$P\_tx = \text{MEDIAN}(P', P\_max, P\_min)[dBm] \quad \text{[Formula 8]}$$

$$P' = \begin{cases} \alpha \times P\_M + \beta & (P\_UL < \text{Threshold}) \\ (A - \alpha' \times P\_UL) + \beta' & (P\_UL \geq \text{Threshold}) \end{cases}$$

or $$P' = \begin{cases} \alpha \times P\_M + \beta & (P\_UL < \text{Threshold}) \\ \alpha \times P\_M + \beta - \alpha' \times P\_UL & (P\_UL \geq \text{Threshold}) \end{cases}$$

In Formula 8, P_tx, P_max, P_min, P_M, $\alpha$, $\beta$ and MEDIAN (A, B, C) are identical to those defined in Formula 1. The $\alpha'$ and $\beta'$ indicate constants or parameters (or combinations) for a power control, respectively. The A indicates a constant or a parameter (combination) for a power control. And, the P_UL indicates a UL interference size measured from a user equipment (e.g., a macro user equipment) or a value associated with the UL interference size.

$$P\_tx = \text{MEDIAN}(P', P\_max, P\_min)[dBm] \quad \text{[Formula 9]}$$

$$P' = \begin{cases} \alpha \times P\_M + \beta & (P\_UL < \text{Threshold}) \\ \alpha' \times \dfrac{P\_M}{P\_UL} + \beta' & (P\_UL \geq \text{Threshold}) \end{cases}$$

In Formula 9, P_tx, P_max, P_min, P_M, $\alpha$, $\beta$ and MEDIAN (A, B, C) are identical to those defined in Formula 1. The $\alpha'$ and $\beta'$ indicate constants or parameters (or combinations) for a power control, respectively. And, the P_UL indicates a UL interference size measured from a user equipment (e.g., a macro user equipment) or a value associated with the UL interference size.

Figure 8:
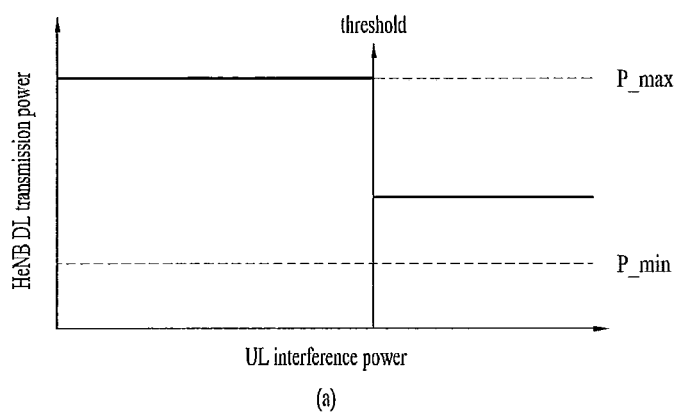
Figure 8:
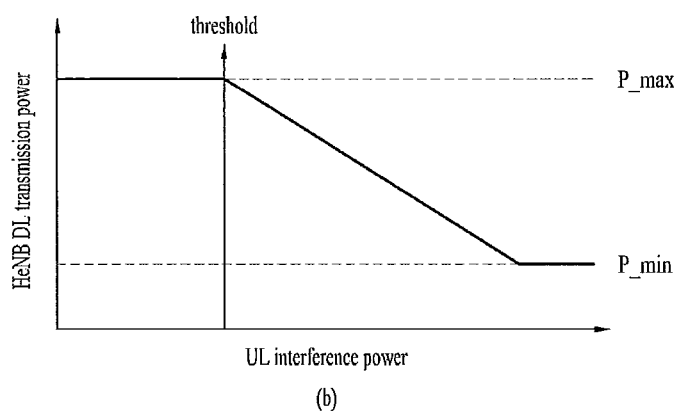

FIG. 8 shows one example of a power control method according to a $2^{nd}$ embodiment of the present invention. The present example assumes a situation of 'P_tx=P_max' if a UL interference size is smaller than a threshold. Referring to FIG. 8 (a), if a size of UL interference exceeds a threshold, as the size of the UL interference increases, P_tx of a home eNodeB is maintained small at a predetermined level. On the contrary, referring to FIG. 8 (b), if a size of UL interference exceeds a threshold, as the size of the UL interference increases, P_tx of a home eNodeB is lowered at a predetermined rate. This is exemplary. After the threshold, as the size of the UL interference increases, P_tx may be lowered step by step. After the size of the UL interference has been divided into several intervals, as the size of the UL interference becomes greater than the threshold, the P_tx may be lowered at a rate given to each of the intervals.

According to the above-described example, proposed is a method of adaptively controlling the parameter $\alpha \times P\_M+\beta$ (=P') shown in Formula 1 in consideration of a UL interference size. This is just exemplary. Alternatively, it may be able to consider controlling the P_max of Formula 1 in consideration of a UL interference size. In particular, if UL interference exceeds a predetermined threshold, the home eNodeB determines that a macro user equipment exists in a neighbor area and may be then able to set P_max of the home eNodeB to have a value smaller than an original value. For instance, if the UL interference size exceeds the threshold, the home eNodeB may be able to maintain the P_tx as a predetermined value smaller than the original value. For another instance, if the UL interference exceeds a predetermined threshold, the home eNodeB may be able to adaptively lower the P_max in consideration of a size of the UL interference.

Formulas 10 to 13 may show examples of a power control method according to the present embodiment.

$$P\_tx = \text{MEDIAN}_{P'\_\max, P\_\min}^{(\alpha \times P\_M + \beta,)} [dBm] \quad \text{[Formula 10]}$$

$$P'\_\max = \begin{cases} P\_\max & (P\_UL < \text{Threshold}) \\ \gamma & (P\_UL \geq \text{Threshold}) \end{cases}$$

or $$P'\_\max = \begin{cases} P\_\max & (P\_UL < \text{Threshold}) \\ P\_\max - \gamma' & (P\_UL \geq \text{Threshold}). \end{cases}$$

In Formula 10, P_tx, P_max, P_min, P_M, α, β and MEDIAN (A, B, C) are identical to those defined in Formula 1. P_UL indicates a UL interference size measured from a user equipment (e.g., a macro user equipment) or a value associated with the UL interference size. And, γ indicates a constant or a parameter (combination) for a power control (γ<P_max). Moreover, γ' indicates a constant or a parameter (combination) for a power control.

$$P\_tx = \text{MEDIAN}_{P'\_\max, P\_\min}^{(\alpha \times P\_M + \beta,)} [dBm] \quad \text{[Formula 11]}$$

$$P'\_\max = \begin{cases} P\_\max & (P\_UL < \text{Threshold}\_1) \\ \gamma_1 & (\text{Threshold}\_1 \leq P\_UL < \text{Threshold}\_2) \\ \gamma_2 & (\text{Threshold}\_2 \leq P\_UL < \text{Threshold}\_3) \\ \vdots & \\ \gamma_n & (\text{Threshold}\_n \leq P\_UL < \text{Threshold}\_n+1) \end{cases}$$

or $$P'\_\max = \begin{cases} P\_\max & (P\_UL < \text{Threshold}\_1) \\ P\_\max - \gamma'_1 & (\text{Threshold}\_1 \leq P\_UL < \text{Threshold}\_2) \\ P\_\max - \gamma'_2 & (\text{Threshold}\_2 \leq P\_UL < \text{Threshold}\_3) \\ \vdots & \\ P\_\max - \gamma'_n & (\text{Threshold}\_n \leq P\_UL < \text{Threshold}\_n+1) \end{cases}$$

In Formula 11, P_tx, P_max, P_min, P_M, α, β and MEDIAN (A, B, C) are identical to those defined in Formula 1. P_UL indicates a UL interference size measured from a user equipment (e.g., a macro user equipment) or a value associated with the UL interference size. And, $\gamma_1, \gamma_2, \ldots \gamma_n$ indicate constants or parameters (combinations) for a power control (P_max>$\gamma_1$>$\gamma_2$> ... >$\gamma_n$). Moreover, And, $\gamma'_1, \gamma'_2, \ldots \gamma'_n$ indicate constants or parameters (combinations) for a power control ($\gamma'_1$<$\gamma'_2$< ... <$\gamma'_n$).

$$P\_tx = \text{MEDIAN}_{P'\_\max, P\_\min}^{(\alpha \times P\_M + \beta,)} [dBm] \quad \text{[Formula 12]}$$

$$P'\_\max = \begin{cases} P\_\max & (P\_UL < \text{Threshold}) \\ (A - \alpha' \times P\_UL) + \beta' & (P\_UL \geq \text{Threshold}) \end{cases}$$

or $$P'\_\max = \begin{cases} P\_\max & (P\_UL < \text{Threshold}) \\ P\_\max - \alpha' \times P\_UL & (P\_UL \geq \text{Threshold}). \end{cases}$$

In Formula 12, P_tx, P_max, P_min, P_M, α, β and MEDIAN (A, B, C) are identical to those defined in Formula 1. The α' and β' indicate constants or parameters (or combinations) for a power control, respectively. The A indicates a constant or a parameter (combination) for a power control. And, the P_UL indicates a UL interference size measured from a user equipment (e.g., a macro user equipment) or a value associated with the UL interference size.

$$P\_tx = \text{MEDIAN}_{P'\_\max, P\_\min}^{(\alpha \times P\_M + \beta,)} [dBm] \quad \text{[Formula 13]}$$

$$P'\_\max = \begin{cases} P\_\max & (P\_UL < \text{Threshold}) \\ \alpha' \times \dfrac{P\_\max}{P\_UL} + \beta' & (P\_UL \geq \text{Threshold}). \end{cases}$$

In Formula 13, P_tx, P_max, P_min, P_M, α, β and MEDIAN (A, B, C) are identical to those defined in Formula 1. The α' and β' indicate constants or parameters (or combinations) for a power control, respectively. And, the P_UL indicates a UL interference size measured from a user equipment (e.g., a macro user equipment) or a value associated with the UL interference size.

For clarity and convenience, although the $1^{st}$ embodiment and the $2^{nd}$ embodiment are independently described, they may be combined together. For instance, the parameter α×P_M+β(=P') in Formula 1 may be controlled in consideration of both a signal strength (e.g., P_M) and a UL interference (P_UL) of a macro eNodeB. For another instance, P_max is controlled like Formulas 10 to 13 in consideration of a UL interference size and P' of a home eNodeB may be controlled like Formulas 2 to 5 in consideration of a signal strength (e.g., P_M) of a macro eNodeB.

Moreover, a home eNodeB may be able to apply the above-mentioned DL power control methods in a manner of combining the methods in accordance with a presence or non-presence of a home user equipment. For instance, only if a measurement report made by the home user equipment exists, the DL transmission power control method according to the $1^{st}$ embodiment of the present invention may be applied. On the contrary, if a measurement report made by the home user equipment does not exist, P_tx of the home eNodeB may be set to a previously determined default value or a value according to Formula 1.

Figure 9:
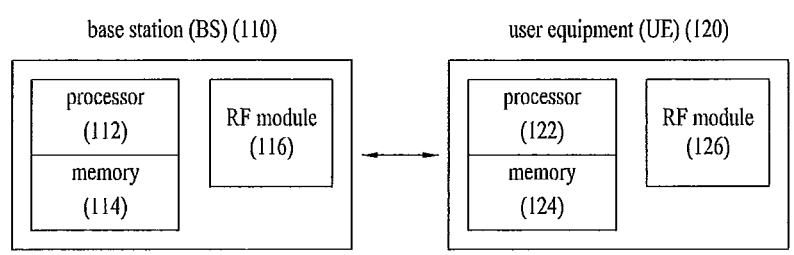
FIG. 9 is a diagram for one example of a base station and a user equipment applicable to one embodiment of the present invention.

FIG. 9 is a diagram for one example of a base station (eNodeB) and a user equipment applicable to one embodiment of the present invention. In this case, the base station may include a macro base station or a home base station. Similarly, the user equipment may include a macro user equipment or a home user equipment. In case that a relay is included in a wireless communication system, a communication is performed between a base station and a relay in a backhaul link or a communication is performed between a relay and a user equipment in an access link. Therefore, the base station or user equipment shown in the drawing can be substituted with the relay to cope with a given situation.

Referring to FIG. 9, a wireless communication includes a base station (BS) 110 and a user equipment (UE) 120. The base station 100 includes a processor 112, a memory 114 and a radio frequency (RF) unit 116. The processor 112 can be configured to implement the procedures and/or methods proposed by the present invention. The memory 114 is connected to the processor 112 and stores various kinds of informations related to operations of the processor 112. The RF unit 116 is connected to the processor 112 and transmits and/or receives radio signals. The user equipment 120 includes a processor 122, a memory 124 and an RF unit 126. The processor 122 can be configured to implement the procedures and/or methods proposed by the present invention. The memory 124 is connected to the processor 122 and stores various kinds of informations related to operations of the processor 122. The RF unit 126 is connected to the processor 122 and transmits and/or receives radio signals. The base station 110 and/or the user equipment 120 may have a single antenna or a multi-antenna.

The above-described embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, embodiments of the present invention are described centering on the data transmission/reception relations between a base station and a terminal. In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other networks except the base station. In this case, 'base station' can be replaced by such a terminology as a fixed station, a Node B, an eNode B (eNB), an access point and the like. And, 'terminal' can be replaced by such a terminology as a user equipment (UE), a mobile station (MS), a mobile subscriber station (MSS)' and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

As mentioned in the foregoing description, the present invention is applicable to such a wireless communication device as a user equipment, a relay, a base station and the like.

What is claimed is:

1. A method for performing power control by a home base station in a wireless communication system, the method comprising:
acquiring a parameter value related with signal strength of a macro base station;
determining an upper power limit of the home base station in consideration of the signal strength of the macro base station; and
performing signal transmission in consideration of the upper power limit of the home base station,
wherein if a first input condition(s) including that the parameter value is equal to or more than a first threshold value is satisfied, the upper power limit of the home base station is given as an intermediate value among a minimum power value, a maximum power value, and a power control value proportional to the signal strength of the macro base station, and
wherein if a second input condition(s) including that the parameter value is less than the first threshold value is satisfied, the upper power limit of the home base station is given as a pre-determined value.

2. The method of claim 1, wherein the acquiring the parameter value includes receiving a measurement report on signals of the macro base station from a user equipment.

3. The method of claim 1, wherein the acquiring the parameter value includes measuring signals of the macro base station at the home base station.

4. The method of claim 1, wherein the power control value (P') is given by following Equation:

$$P'=\alpha \times P\_M+\beta$$

where, P_M represents a parameter value related with the signal strength of the macro base station,
α represents a positive value, and
β represents a correction value for power control.

5. The method of claim 1, wherein if a value indicating uplink signal strength of a macro user equipment is equal to or more than a second threshold value, the power control value is decreased in consideration the uplink signal strength, and
wherein if the value indicating the uplink signal strength of the macro user equipment is less than the second threshold value, the power control value is maintained as it is.

6. The method of claim 1, wherein if a value indicating uplink signal strength of a macro user equipment is equal to or more than a second threshold value, the maximum power value is decreased in consideration of the uplink signal strength, and wherein if the value indicating the uplink signal strength of the macro user equipment is less than the second threshold value, the maximum power value is maintained as it is.

7. A home base station configured to perform power control in a wireless communication system, the home base station comprising:
- a radio frequency (RF) unit; and
- a processor,
- wherein the processor is configured to acquire a parameter value related with signal strength of a macro base station,
- to determine an upper power limit of the home base station in consideration of the signal strength of the macro base station, and
- to perform signal transmission in consideration of the upper power limit of the home base station,
- wherein if a first input condition(s) including that the parameter value is equal to or more than a first threshold value is satisfied, the upper power limit of the home base station is given as an intermediate value among a minimum power value, a maximum power value, and a power control value proportional to the signal strength of the macro base station, and
- wherein if a second input condition(s) including that the parameter value is less than the first threshold value is satisfied, the upper power limit of the home base station is given as a pre-determined value.

8. The home base station of claim 7, wherein the acquiring the parameter value includes receiving a measurement report on signals of the macro base station from a user equipment.

9. The home base station of claim 7, wherein the acquiring the parameter value includes measuring signals of the macro base station at the home base station.

10. The home base station of claim 7, wherein the power control value (P') is given by following Equation:

$$P' = \alpha \times P\_M + \beta$$

where, $P\_M$ represents a parameter value related with the signal strength of the macro base station,
$\alpha$ represents a positive value, and
$\beta$ represents a correction value for power control.

11. The home base station of claim 7, wherein if a value indicating uplink signal strength of a macro user equipment is equal to or more than a second threshold value, the power control value is decreased in consideration of the uplink signal strength, and
wherein if the value indicating the uplink signal strength of the macro user equipment is less than the second threshold value, the power control value is maintained as it is.

12. The home base station of claim 7, wherein if a value indicating uplink signal strength of a macro user equipment is equal to or more than a second threshold value, the maximum power value is decreased in consideration of the uplink signal strength, and
wherein if the value indicating the uplink signal strength of the macro user equipment is less than the second threshold value, the maximum power value is maintained as it is.

* * * * *